March 22, 1966   P. L. YOUNG   3,241,467
UNIVERSAL CONTROL KNOB FOR UNDERWATER APPARATUS
Filed June 21, 1961

INVENTOR.
PAUL L. YOUNG
BY *Kenway, Jenney & Hildreth*

ATTORNEYS

# United States Patent Office 3,241,467
Patented Mar. 22, 1966

3,241,467
UNIVERSAL CONTROL KNOB FOR UNDERWATER
APPARATUS
Paul L. Young, 233 Grove St., Auburndale, Mass.
Filed June 21, 1961, Ser. No. 118,624
5 Claims. (Cl. 95—11)

My invention relates to underwater apparatus, such as cameras used for underwater photography and the like, and particularly to a novel universal control knob for adapting a standard underwater camera case to apparatus of any desired configuration and control requirements.

Underwater photography has become increasingly popular, for its scientific as well as its recreational value. Heretofore, however, the cost of suitable photographic apparatus for underwater use has been excessive, because of the difficulties inherent in providing an adequate seal for the camera while permitting external operation of the shutter, film advance, aperture and focus control. Usually, it has been necessary either to select a camera for which an underwater operating case has been especially designed and made available, or to build a case especially for a particular camera. The latter procedure ordinarily leads to a complex, cumbersome and expensive apparatus, because the average photographer has neither the tools nor the skill to design a successful camera case. On the other hand, due to the economics dictated by the limited market for a case for a particular camera, commercially available underwater cases have been unduly expensive.

Of the two major problems involved in providing a satisfactory underwater camera case, that of providing a suitable sealed enclosure is readily solved. The second problem, that of providing suitable control of the camera from outside of the case while maintaining the seal, is more difficult of solution. Of course, many devices for transmitting motion through a sealed container have been developed, but in general these are either highly complex, or have stringent requirements of manufacturing precision, or both. Thus, so far as I am aware, the problem of incorporating economical and practical sealed external controls into a camera case is one for which no satisfactory solution has been proposed.

In accordance with my invention, a universal control knob is provided for transmitting various types of motion through a sealed enclosure which is simple and inexpensive to make, and which does not require high tolerances in manufacture. Moreover, an external camera control is provided which is readily incorporated in a standardized sealed enclosure, for use in operating any of the controls of a selected camera, by merely drilling a hole in the camera case at the desired location and inserting the control knob of my invention. Adaptation to the particular function and camera selected is made by the addition of a single adapter, which is the only part of my apparatus which need be designed for the particular camera and function to be controlled.

Briefly, the universal control knob of my invention comprises a combined bearing and mouting sleeve which serves to mount the knob on a camera case, and also as a bearing for a rotatable actuating knob. The knob is provided with an eccentric bearing for a blind sealing tube that is sealed at its other end to the bearing and mounting sleeve. An actuating crank is rotatably mounted in the sealing tube, and is formed integral with an output shaft which extends through the bearing and mounting sleeve to an adapter within the camera case, the adapter being connected to a selected camera control. By this arrangement, it is possible to provide a universal adjustment knob which may be installed without expensive equipment, requires no close tolerances in manufacture, and yet offers a rugged and reliable control which is positively sealed against leakage.

My invention will be best understood by reference to the accompanying drawings, together with the following description, of a preferred embodiment thereof.

Figure 1:
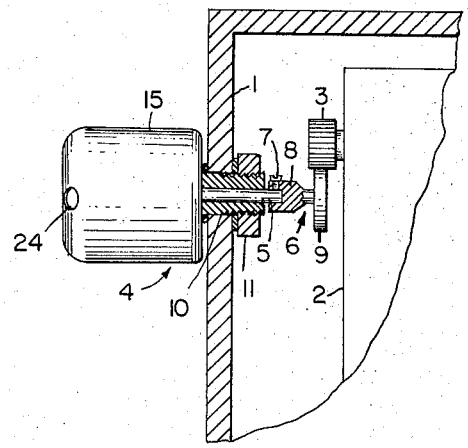
FIGURE 1 is a fragmentary cross-sectional elevational view of a camera case incorporating the universal knob of my invention, showing the mode of attachment to a conventional camera.

Referring now to FIGURE 1, I have shown a portion of a sealed camera case 1, in which a conventional camera fragmentarily indicated at 2 is assumed to be mounted by conventional means, not shown. The camera 2 is provided with an actuating knob 3, as for film advance or other conventional function. The control knob of my invention, generally designated by 4, is attached to the wall of the case 1, by means to be described, and is provided with an output shaft 5. The output shaft 5 is connected to an adapter generally indicated by 6 by conventional means such as a set screw 7 in a sleeve 8 formed on the adapter. Means such as a wheel 9, of rubber or the like, is formed on the adapter to drive the actuating knob 3 upon rotation of the output shaft 5.

Figure 2:
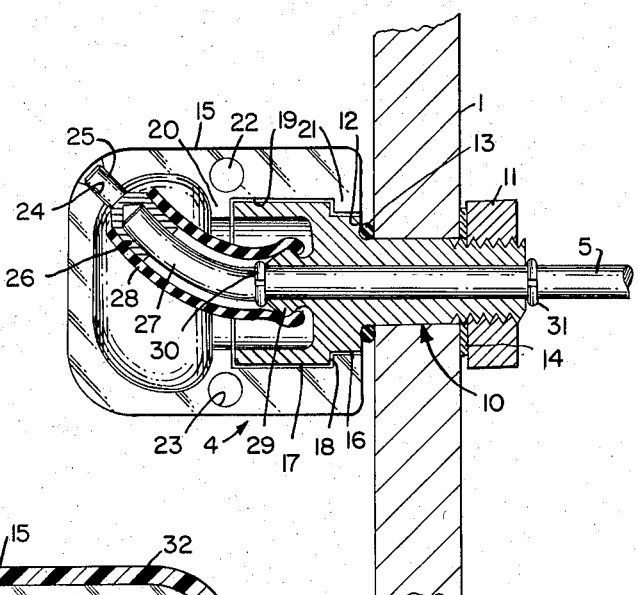
FIGURE 2 is a cross-sectional elevational view of the actuating knob employed in the combination shown in FIGURE 1.

Referring now to FIGURE 2, I have shown the control knob 4 of my invention in more detail. As shown, the knob 4 is attached to the wall of the case 1 by a combined bearing and mounting sleeve generally designated by 10. The sleeve 10 extends through a suitable aperture in the wall of the case 1, where it is secured by a nut 11 engaging threads formed on the end of sleeve 10 and adapted to draw a shoulder 12 formed on the sleeve 10 into engagement with a sealing ring 13, of compressible material, which surrounds the sleeve and engages the wall of the case 1. The seal may be further improved by the insertion of a sealing washer 14 between the nut 11 and case 1, as shown, if so desired.

A control knob 15 is rotatably mounted on the sleeve 10. For this purpose, the sleeve 10 is provided with bearing surfaces 16 and 17, the latter being raised above the former to provide a retaining shoulder 18. The knob 15 is provided with a groove 19 and lands 20 and 21 which form bearing surfaces cooperating with the corresponding surfaces on the sleeve 10. The lands 20 and 21 also cooperate with the shoulder 18 and the outer end of the sleeve 10 to prevent axial movement of the knob 15.

As schematically indicated, the knob 15 may be made in two halves, of molded plastic or the like, and provided with apertures such as 22 and 23 for bolts, not shown, to hold the halves together. Alternatively, the apertures may be replaced by locating projections on one half to register with corresponding apertures on the other half, and the two halves cemented together.

The knob 15 is provided with an eccentric bearing aperture 24, which is adapted to receive a pin 25 for rotation. Pin 25 has an enlarged collar 26 formed on one end thereof, which is provided with an axial bore to serve as a bearing for a crank arm 27 formed on output shaft 5.

A resilient sealing sleeve 28, of rubber or the like, is secured at one end to collar 26, and at the other end to a collar 29 formed on the sleeve 10. This sleeve is permitted to flex torsionally as knob 15 rotates, but is restrained against rotation with respect to collars 26 and 29 by friction. The sleeve 28 provides a positive seal between the crank arm 27 and the control knob 15, and yet permits a driving connection between the two. Rotation of pin 25 in bearing aperture 24 prevents cumulative twisting of the sleeve 28.

As shown in FIG. 2, split ring clips 30 and 31 may be provided on output shaft 5 to maintain the axial position of the output shaft with respect to the sleeve 10. If so desired, grooves, not shown, may be formed on the output shaft to receive these clips.

Figure 3:
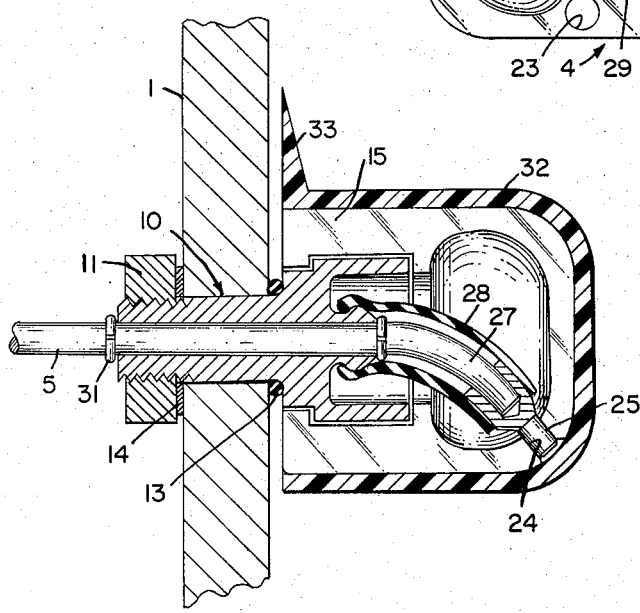
FIGURE 3 is a cross-sectional view of a modification of my invention in which a combined housing and indicator is provided.

An additional feature which may be incorporated in the control knob of my invention is shown in FIG. 3. In FIG. 3, parts corresponding to those in FIGURES 1 and 2 have been given corresponding reference characters. In order to provide an external index of the position of the knob 15, an external sleeve 32, of rubber or the like, is mounted on the knob. The sleeve 32 is provided with an extension 33 forming an index pointer, which may cooperate with suitable indicia on the wall of the case 1 to indicate the angular position of the knob 15, and thus indicate the adjusted state of the camera control to which the knob is connected.

With the construction shown in FIG. 3, it is possible to omit unattractive means such as bolts or visible cemented joints for securing together the two halves of the knob 15, and to rely on the sleeve 32 to hold the parts together. This construction facilitates assembly, and, if made with a land and groove or other known expedient to give a "snap together" fit, would eliminate the need for cement or other hardware, and also permit disassembly, for repair or replacement of parts of the knob.

The installation and mode of operation of the universal control knob of my invention will be apparent from the above description. First, a hole is drilled in the camera case adjacent the mounted position of the control to be operated, and the mounting and bearing sleeve 10 is inserted, then secured with the nut 11. An appropriately formed adapter, such as the adapter 6 in FIG. 1, is then connected between the output shaft 5 and the selected camera control. Thereafter, the selected control may be manipulated from the outside of the case by rotation of knob 15 through any selected number of revolutions or parts of a revolution.

An important advantage of the novel control knob of my invention is that the required projection of the knob from the case is small, so that it is unlikely that the knob will catch in the clothing of the user, or on underwater obstructions. Moreover, faulty operation of the sealed apparatus caused by inadvertent blows or bumps against an obstruction is prevented, since an applied torque is required to rotate the knob. Another distinct advantage, is that the only projection required within the case, aside from the actuating wheel, gear, or linkage, is the thickness of the mounting nut. Thus, the coupling device may be positioned very close to the wall of the case, if so desired.

While I have described various embodiments of my invention in detail, many changes and variations will be apparent to those skilled in the art upon reading my description, and such can obviously be made without departing from the scope of my invention.

Having thus described my invention, what I claim is:

1. Means for transmitting motion through a sealed enclosure, comprising a mounting sleeve having a central bore defining an axis, and formed with a reduced portion at one end adapted to extend through an aperture in the wall of a sealed enclosure, a first raised bearing surface on said sleeve adjacent said reduced portion and forming a shoulder to limit the extension of said sleeve into the enclosure, means for securing the sleeve to the wall of the enclosure, a second bearing surface on said sleeve adjacent said first bearing surface and raised above it to form a second shoulder, an actuating knob rotatably mounted on said bearing surfaces and having a land engaging said second shoulder to retain it on the sleeve, a bearing aperture in said knob and displaced from the axis of said bore, an output shaft extending through said bore into said enclosure and having an end within said knob bent into alignment with said bearing aperture, a bearing sleeve rotatably mounted on the bent end of said output shaft and provided with a shaft extending into said bearing aperture, a nipple formed on said sleeve concentric with said bore and adjacent the second bearing surface, and a flexible tube having one end secured on said nipple and the other end secured on said bearing sleeve.

2. Means for transmitting motion through a sealed enclosure, comprising a sleeve extending through a wall of said enclosure, said sleeve having a central bore and provided on the outside of the enclosure with a nipple and a concentric bearing surface, a cylindrical actuating knob mounted on said bearing surface surrounding said sleeve and provided with a bearing aperture out of alignment with said bore, an output shaft extending through said bore and bent within said knob into alignment with said bearing aperture, a flexible tube surrounding the bent end of said shaft and secured at one end to said nipple, means for sealing the other end of said tube, and means for journalling the sealed end of said tube in said aperture.

3. A control knob for transmitting motion through a sealed enclosure, comprising a mounting sleeve having stepped cylindrical bearing surfaces concentric with a central bore, a nipple formed on one end and a mounting stud formed on an opposite end of said sleeve, a cylindrical adjustment knob surrounding said sleeve at the end adjacent said nipple and provided with an annular groove cooperating with said stepped bearing surfaces to rotatably mount the knob on the sleeve and restrain it against axial motion with respect to the sleeve, a bearing formed in said knob at a point displaced from the axis of said bore, an output shaft extending through said bore into said knob and bent into alignment with said bearing, a flexible tube secured at one end to said nipple and surrounding the bent end of said shaft, and means closing the other end of said tube and extending into the bearing formed in said knob to form a journal for the end of said tube.

4. A control knob for transmitting motion through a sealed enclosure, comprising a sleeve having a central bore defining a first axis and provided with a nipple at a first end and a mounting stud at a second end, a raised annular cylindrical bearing surface on said sleeve concentric with and surrounding said nipple, a cylindrical actuating knob surrounding said sleeve at the first end thereof and rotatably mounted on said bearing surface, said knob comprising two hemi-cylindrical parts provided with internal annular lands to engage the ends of said raised bearing surface and hold the knob against axial movement, a flexible sleeve surrounding said knob to hold the parts in engagement with said sleeve, a flexible tube secured to said nipple at one end, means for closing the other end of said tube, means secured to said closing means for journalling said closed end of said tube to said knob for rotation about a second axis inclined to the axis of said central bore, and an output shaft extending through said bore and bent within said tube into alignment with said second axis.

5. A control knob for an underwater camera provided with a case sealed except for an aperture adjacent a camera control to be actuated, comprising, a mounting sleeve sealed in said aperture and provided with a central bore, an output shaft extending through said bore, an actuating element connected to said output shaft within said case and adapted to be connected to the control to be actuated, said shaft extending outside of the case through the sleeve and having an end bent to form a crank arm, a flexible tube sealed at one end, surrounding the bent end of said shaft, and secured at the other end in sealed relation to said sleeve, a cylindrical actuating knob surrounding said sleeve and tube outside of said case and rotatably mounted on said sleeve, and means for journalling the sealed end of said tube in said knob for rotation about an axis inclined to the axis of said bore.

References Cited by the Examiner
UNITED STATES PATENTS 2,784,597  4/1957  Miller _____ 74—18.1

JOHN M. HORAN, *Primary Examiner.*

JAMES W. LOVE, W. B. BROWNE, *Examiners.*